Nov. 29, 1966 A. W. HAYDON 3,288,934

TIME TOTALIZER SYSTEM FOR TELEPHONE CIRCUITS AND THE LIKE

Filed June 10, 1963 2 Sheets-Sheet 1

INVENTOR.
ARTHUR W. HAYDON

BY Mandeville & Schweitzer
ATTORNEYS

Nov. 29, 1966 A. W. HAYDON 3,288,934

TIME TOTALIZER SYSTEM FOR TELEPHONE CIRCUITS AND THE LIKE

Filed June 10, 1963 2 Sheets-Sheet 2

INVENTOR.
ARTHUR W. HAYDON
BY
Mandeville & Schweitzer
ATTORNEYS

United States Patent Office 3,288,934
Patented Nov. 29, 1966

3,288,934

TIME TOTALIZER SYSTEM FOR TELEPHONE CIRCUITS AND THE LIKE

Arthur W. Haydon, Milford, Conn., assignor to Tri-Tech, Inc., a corporation of Connecticut Filed June 10, 1963, Ser. No. 286,641
17 Claims. (Cl. 179—8)

The present invention relates to recording systems generally, and is directed more particularly to a novel system for recording the time usage of a plurality of telephone circuits, for example.

In the system of the invention, a plurality of decimal read-out counters, calibrated to indicate elapsed time, are closely grouped on a display board, and each counter is associated with a separate telephone circuit, for example, and is actuated by use of the circuit to record the total time in which the circuit is in use. Periodically, the condition of the display board on which the various counters are exposed is permanently recorded, advantageously by a photographic exposure. In this way a permanent accounting record is made of a large plurality of telephone circuits or the like, from which customer billing or other accounting operations may be carried out.

The system of the invention being intended specifically for (although not necessarily limited to) the recording of the time usage of telephone circuits, which are operated primarily by public utility organizations, it is of particular and critical importance to provide a system free of cumulative error in the utility's favor. Likewise, although cumulative error in the customer's favor would be tolerable from the standpoint of a regulatory commission, such error would represent an undesirable loss of income to the utility and must be maintained at an absolute minimum. The system of the present invention thus includes special features substantially precluding error in either direction and specifically in a direction in favor of the utility.

In accordance with another aspect of the invention, special provisions are made for insuring that decimal read-out counters, associated with individual telephone circuits or the like, present non-moving indicia throughout a significantly large proportion of their operating cycles, such that the opportunity for photographically recording a moving counter is greatly reduced. In this respect, it has been proposed that periodic (usually monthly) customer billing be carried out on the basis of photographic recordings of counter panels. Since a particular panel encompassed by a single photograph usually will contain a very large number (e.g., several hundred) of counter-indicators, there would be a high probability that one or more of the counters would be in motion at a given instant, if conventional counters were employed in the system. However, in accordance with the invention, novel provisions are made for effecting substantially instantaneous transfer or indexing of the counters, such that the proportion of counting cycles involved in indexing or transferring is very small. The arrangement is such that the normal probability of one or more units of an operating counter bank being in motion at a given instant is reduced significantly and to such an extent that the problem of photographically recording one or more moving counters is of little practical consequence.

As one of the significant features of the invention, a novel and improved counter-indicator is provided which includes an "overcentering" free transfer movement on at least the lowest order indicating drum. To this end, the counter includes a "lost motion" drive arrangement enabling the counter to transfer independently of its continuously coupled drive motor, upon reaching the overcentering condition of the transfer mechanism. The arrangement is such that transfer or indexing movements of the lowest order indicating drum or element of the counter are practically instantaneous, whereby the indexing time is an extremely small fraction of the total time involved in the making of a complete revolution of the lowest order drum. In contrast, indexing movements of the lowest order drum of a conventional counter mechanism are occurring approximately 10 percent of the time (making it almost a statistical certainty that one or more counters of a bank of several hundred operating counters would be in motion at any given instant).

More importantly, the counter-indicator of the invention, incorporating instantaneous free transfer action, although continuously coupled to an individual drive motor, accommodates the completion of an initiated transfer movement, even though the drive motor is deenergized, by termination of the monitored event or otherwise. Thus, the invention, in addition to providing for a substantially instantaneous transfer action in a counter-indicator mechanism, provides further that under no circumstances will a counter-indicator "hang" or hold in a partly transferred condition.

In conjunction with the foregoing, the system of the invention includes an energizing system for a bank of separately driven, instantaneous free transfer counter-indicators, which causes the entire counter bank to be deenergized momentarily, to enable a photographic or similar recording to be made of the instantaneous condition of the counter bank. Advantageously, and in accordance with a specific aspect of the invention, automatic control circuit means are provided whereby, upon command and in automatic sequence, (a) energizing power is removed from all of the drive motors of a counter bank, (b) an extremely short (fraction of a second) transfer interval passes, to accommodate the completion of free transfer of any then-transferring counters, (c) a photographic or other recording is made of the counter bank, and (d) energizing power is restored to the counter bank, enabling all of the active units to resume recording. With the system of the invention, the entire sequence may be completed in a fraction of one second.

In accordance with another specific aspect of the invention, the new counter-indicator is driven, in accordance with time utilization of a telephone or other circuit, by a synchronous electric motor having substantially instantaneous start-stop characteristics and, in particular, having the characteristic of not "coasting" significantly after deenergization. Specifically, the system of the invention advantageously incorporates a unidirectionally self-starting synchronous inductor motor having a non-salient ferrite rotor. The arrangement is such that the system is brought up to synchronous speed within about one half cycle of an A.C. power source, and is stopped about as fast when power is removed, so that the cumulative indication is extremely accurate, without significant error in favor of either the customer or the utility.

For a better understanding of the invention reference should be made to the following detailed description and to the accompanying drawing in which.

Figures 1, 5:
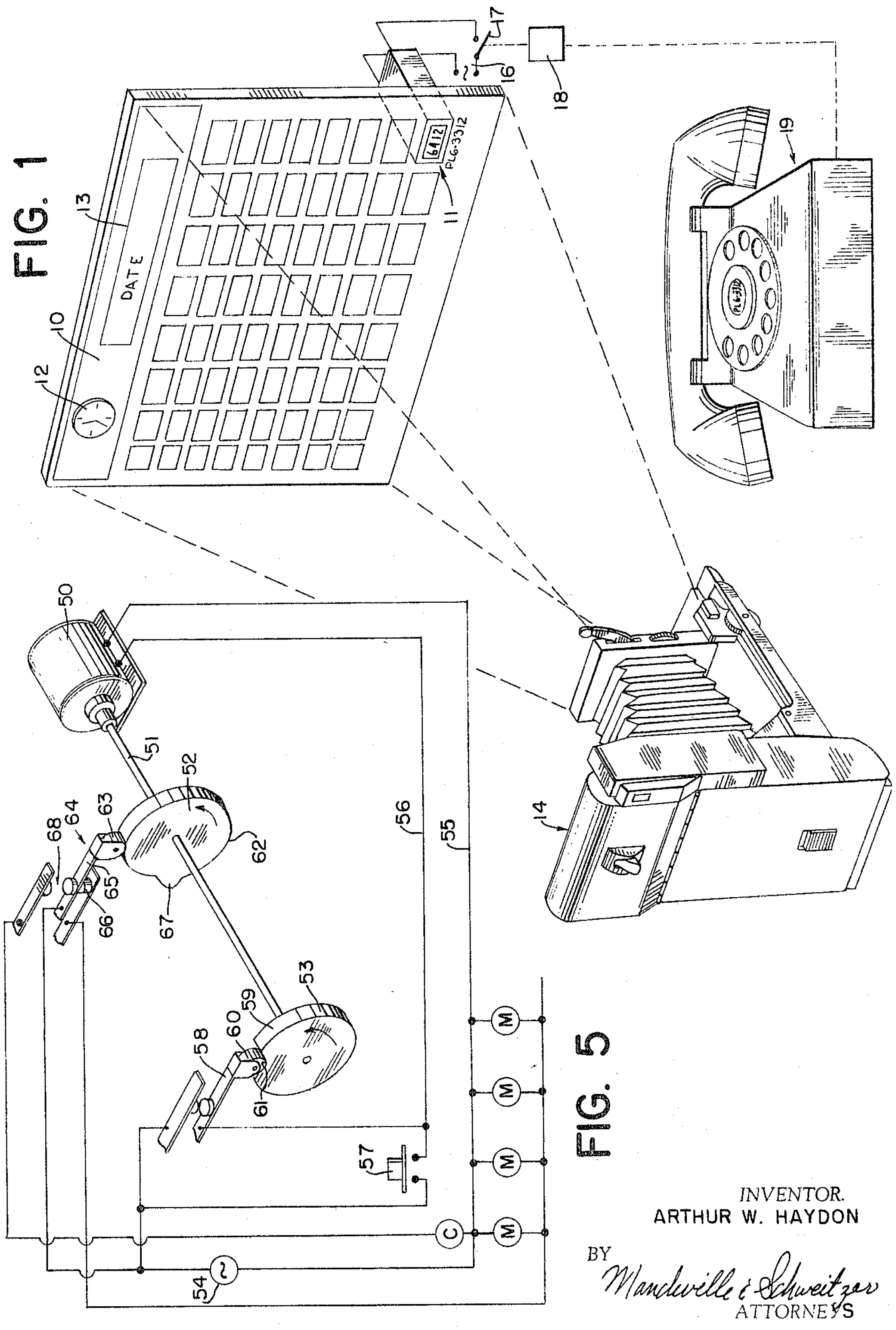
FIG. 1 is a simplified schematic representation of a recording system incorporating the principles of the invention.
FIG. 5 is a simplified schematic representation of a control system according to the invention for performing automatically and in desired rapid sequence a series of operations involved in making a photographic or other recording of the instantaneous condition of a bank of counter-indicators.

Referring now to the drawing, and initially to FIG. 1, the reference numeral 10 designates a display board in which are mounted a large plurality of counter-indicators, generally designated by the reference numeral 11. In FIG. 1, only one of the counters 11 is completely illustrated, it being understood, however, that a similar counter is installed in each of the rectangular openings indicated on the face of the display panel 10. In a typical installation, there may be several hundred counters associated with a display board.

For convenience, each display board may be provided with a clock 12 and a calendar 13 positioned adjacent the closely grouped counters 11. The arrangement is such that a photographic record of the display panel 10 may be made, as by a conventional camera 14, which will provide a permanent indication of the condition of the individual counters 11 together with the time and date at which such condition existed.

Each of the counters 11, to be described in more detail, includes a synchronous motor 15 (FIGS. 2 and 3) arranged to be energized from a suitable alternating current source 16 upon closure of contacts 17 actuated by a relay 18. The relay 18 is associated in an appropriate manner (details of which are not pertinent hereto) with the circuit of an individual telephone 19, the arrangement being such that, when the telephone circuit is in operation, the switch contacts 17 are closed and the counter 11 is driven by its synchronous motor 15. The counter 11, being calibrated in units of time, therefore provides a cumulative record of the time usage of the telephone 19.

In order to insure accurate operation of the counter 11, without significant cumulative error in either direction, and particularly without error in the utility's favor, it is extremely important that the drive motor 15 for each counter has substantially instantaneous start-stop characteristics. At the same time, in view of the extraordinarily large number of motor driven counters required for widespread application of the system, it is important that the drive motors be of simple, low-cost construction. To this end, the motor 15 advantageously is of the type incorporating the principles of the L. J. A. Van Lieshout Patent No. 2,981,855, and also possibly incorporating the principles of the W. D. Riggs Patent No. 3,014,141, both of the foregoing being assigned to Consolidated Electronics Industries Corp., of Waterbury, Connecticut. In this respect, the disclosures of the beforementioned patents may be considered as part of the present disclosure, and reference may be made directly thereto for further details. For the purpose of this application, motors of the type referred to in the Van Lieshout and Riggs disclosures may be described as unidirectionally self-starting synchronous inductor motors having non-salient ferrite rotors.

Synchronous motors of the type described in the Van Lieshout and Riggs disclosures and contemplated to be incorporated in the system of the invetnion are commercially available from the A. W. Haydon Company Division of Consolidated Electronics Industries Corp. under the manufacturer's designation 22100 Series or 42100 Series A.C. Timing Motors. Such motors are capable of acceleration to synchronous speed in approximately one-half power line cycle, and also have almost instant stopping characteristics.

In accordance with the invention, the motor 15 drives the counter mechanism, generally designated by the numeral 20. The specific structural details of the counter mechanism form the subject of a separate copending application, it being particularly significant to the present invention, however, that the counter mechanism includes a novel overcentering free transfer arrangement for the first or lowest order indicating element. The overcentering free transfer means includes a lost motion drive connection, so that transfer of the lowest order indicating element occurs by an overcentering action, independently of the drive motor 15, even though the motor is continuously coupled to the counter.

Advantageously, the general construction of the counter mechanism is in accordance with the principles disclosed and claimed in A. W. Haydon application Serial No. 789,578, filed January 28, 1959, now U.S. Patent No. 3,069,083.

Figure 2:
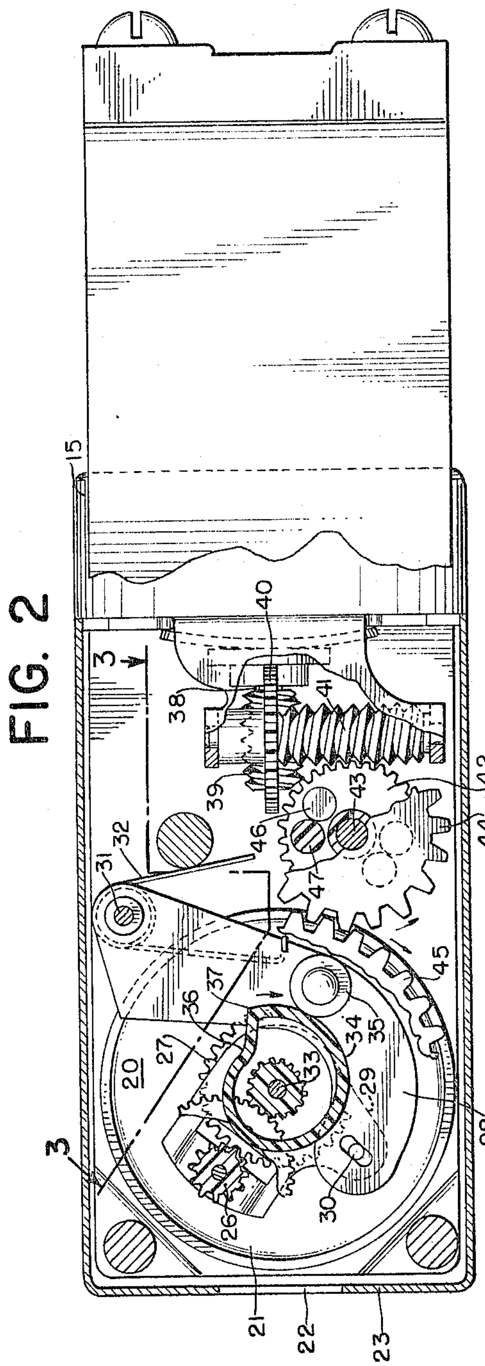
FIG. 2 is an end elevational view, partly in section, of a counter-indicator mechanism according to the invention, for use in the system of FIG. 1.
Figure 4:
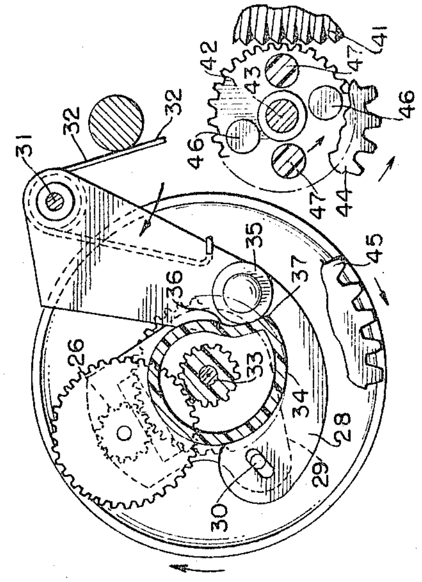
FIG. 4 is a fragmentary, cross-sectional view taken generally along line 4—4 of FIG. 3.
Figure 3:
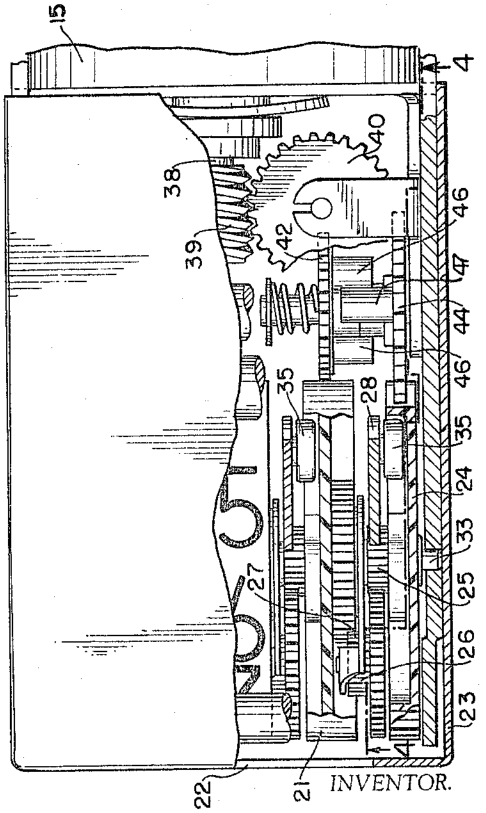
FIG. 3 is a fragmentary, cross-sectional view taken generally along line 3—3 of FIG. 2.

Referring specifically to FIGS. 2–4, the reference numeral 21 designates a counter drum or element, which is the first or lowest order indicating element of the counter, being the first element visible at the right through a viewing slot 22 in the housing 23 provided for the mechanism. Adjacent the element 21 is a non-indicating counter element 24 (FIG. 3) which is arranged to be driven by the motor 15 and which is connected to the lowest order indicating element 21 through a transfer gear mechanism having a predetermined gear reduction ratio. Typically, and in the case of transfer connections between indicating drums, the gear reduction ratio is 10:1.

The transfer mechanism, which includes a drive pinion 25, planetary differential gear 26 and a gear 27 tends normally to advance the indicating element 21 along with the non-indicating element 24, at a correspondingly reduced speed. However, in accordance with the teachings of the beforementioned A. W. Haydon patent, the planetary gear 26 is given a compensating, retracting motion through most of the revolution of the non-indicating element 24 such that, during the compensating period, the indicating element 21 remains motionless. The desired compensating effect is obtained by connecting the planetary gear 26 to a compensating arm 28, by means of a lever 29 and pin 30. The compensating arm 28 is pivoted on a rod 31 and is urged by a spring 32 to pivot in a direction toward the main supporting shaft 33 of the counter drums. However, the arm 28 is controllably moved outward from the shaft 33, throughout most of the revolution of the non-indicating element 24, by means of a cam 34, which advantageously is formed as an integral part of the non-indicating element.

The contour of the cam 34, and its relative position with respect to a cam follower 35 mounted on the compensating arm, is such that, in the "starting" position of the counter, when a new index numeral of the element 21 has just become visible through the opening 22, the cam follower 35 is in its lowermost position (indicated by the numeral 36) on the cam. As the non-indicating element 24 rotates from that point there is a tendency of the planetary gear 26 to advance the first indicating element 21, which tendency is compensated for by the "rising" of the cam follower 35 on the cam surface 34.

When the non-indicating element 24 has been rotated through about 95 percent or more of a complete revolution, the high point 37 of the cam passes under the center of the cam follower 35, whereupon the spring 32 exerts an overcentering action upon the mechanism, tending to advance the cam 34 and the non-indicating element 24 immediately to the low point 36 of the cam. And, in accordance with a specific and important aspect of the invention, the drive means for the non-indicating element 24 includes a lost motion connection, having a sufficient free movement to accommodate free overcentering transfer movement of the element 24 to the equilibrium position, in which the follower 35 lies over the low point 36 in the cam. During the free overcentering motion, the first or lowest order indicating element is advanced through one index position. The actual indexing motion occurs almost instantaneously and represents an extremely small proportion of the total time involved in the making of a complete revolution of the non-indicating element.

As will be understood, if the initial indicating position of the lowest order element 21 is a "nine," the indicating element of the next higher order will be transferred through one index position along with the lowest order element 21. Such higher order indexing will, of course, occur within the same period of time involved with the indexing of the lowest order element 21. Actually, the transfer connections to higher order indicating elements could be of conventional design, if desired, since the important factor is the high speed indexing of the lowest order indicating element. However, it is practical and convenient to utilize standardized transfer means throughout.

The overcentering free transfer operation of the new counter-indicator is particularly important in the contemplated application since it not only provides for substantially instantaneous transfer, independent of the constant speed, continuously coupled drive motor, but more importantly it provides for the continuance of transfer movement to completion even though the drive motor becomes deenergized during the transfer interval. This positively assures that, following momentary deactivation of all units of a counter bank, all counters will be at rest in definite index positions. A photographic record, then taken of the momentarily deactivated bank, can be analyzed and processed free of the difficulties and uncertainties otherwise introduced by partly transferred indicators.

In a typical practical embodiment of the invention, the lowest order indicating element 21 is calibrated to indicate tenths of hours. In other words, each index position represents six minutes. This requires a substantial reduction in the drive between the motor 15 and the non-indicating element 24, which is provided by a suitable gear train including, in accordance with the invention, a lost motion connection. Specifically, the motor output shaft 38 mounts a worm 39 arranged to mesh with a worm gear 40. The gear 40, in turn, drives a second worm 41, which meshes with a worm gear 42 mounted for free rotation on a shaft 43. The shaft 43 also mounts a pinion 44 which meshes with a gear 45 formed on the exterior of the non-indicating counter element 24.

As described in detail in the copending Haydon et al. application Serial Number 286,640, issuing as Patent 3,255,962, directed to specific structural features of the counter mechanism assembly, the worm gear 42 and pinion 44 are provided with interfering lugs 46, 47. As shown best in FIGS. 2 and 4, the lugs 46, 47 are relatively small in a circumferential direction to provide for substantial (e.g., about 90°) free movement of the pinion 44 relative to the worm gear 42.

When the worm gear 42 is driven continuously in one direction (counterclockwise, as viewed in FIG. 2), the lugs 46 will engage and advance the lugs 47 to rotate the pinion 44 and advance the non-indicating element 24 in accordance with the regulated rotation of the motor 15. However, when the non-indicating element 24 reaches its overcentering position, the element 24 and its meshing drive pinion 44 are permitted to advance freely through the overcentering action, the lugs 47 advancing away from the lugs 46 during such free movement. This is illustrated specifically in FIG. 4, wherein the mechanism is shown during an overcentering advancing motion, with the cam follower 35 approaching the low point 36 of the cam by advancing the cam under the influence of the spring 32. The amount of free movement required to be accommodated by the size and location of the interfering lugs 46 and 47 equals the angle of rotation of the element 24 involved in the overcentering movement, multiplied by the gear ratio between the pinion 44 and the non-indicating element 24, as will be understood.

In the normal operation of the system, the synchronous motor 15 of a particular counter assembly is energized and started instantaneously by the completion of an associated telephone circuit, as through a control system including relay 18 and contacts 17. The motor 15 is driven synchronously, in accordance with the power source (typically a 60 cycle commercial source) and drives the worm gear 42 at a reduced speed through the worm reductions 39–41. The gear 42, in turn, drives the pinion 44 through the interfering lugs 46, 47 to rotate the non-indicating counter element 24, advantageously at a rate of one revolution per each six minutes of accumulated operating time of the telephone circuit. After almost six minutes of accumulated time (starting from a "zero" condition), the cam 37 of the non-indicating element 24 will pass its overcenter position, and the mechanism will substantially instantaneously (and unrestricted by the drive motor) advance the first indicating element 21 through one index position. Thereafter, a short interval elapses while the lugs 46 advance toward and into contact with the lugs 47, taking up the "lost motion" involved in the overcentering action. The element 24 then advances through an additional cycle.

The several, separately driven counter-indicators grouped on a single panel board will, of course, be operated separately and independently, in accordance with the activity of the separate telephone lines to be monitored.

Periodically, for example at the end of each month, a permanent recording is made of the then instantaneous condition of the panel board, advantageously by taking a photograph of the entire panel or bank of counter-indicators. In this respect, with a large bank of counters, the probabilities may be substantial that one or more counters will be in operation at any time. This means that there is some possibility, increasing with the number of counters, the density of traffic, etc., that one or more counters may be indexing at any given instant, at which the panel is sought to be photographically recorded. Although available photographic apparatus is capable of "stopping" counters in the process of an indexing movement, experience has shown that substantial practical difficulties arise in the reading of counters whose numbers are not properly registered in the viewing window. Substantial additional accounting time is requred and, more important, errors in reading are frequent.

Thus, in accordance with the invention, there is provided a special recording control system which, when actuated, serves to deactivate momentarily all of the counter units of a given panel or bank of units. The period of deactivation is a small fraction of a second, which is sufficient to enable any indicator unit of the type according to this invention to continue to completion any indexing or transfer movement. In this respect, it will be understood that the previously initiated indexing motion will be completed by an indicator unit, even though its drive motor has been deenergized. After a brief interval, a camera or other recording device is actuated, whereupon all of the indicator units are reactivated and enabled to continue their monitoring functions.

In one advantageous form, the contemplated control circuitry comprises an electro-mechanical repeat cycle timer adapted, when momentarily actuated, to carry out a complete control cycle and then come to rest. Referring specifically to FIG. 5 of the drawing, an advantageous form of repeat cycle timer for use in conjunction with the system of FIG. 1 comprises a motor 50 having an output shaft 51, typically arranged for operation at a speed of one revolution per second and mounting first and second control cams 52, 53 for rotation in unison. The motor 50 is arranged to be energized from an A.C. source 54 through a ground conductor 55 and a conductor 56. The conductor 56 normally is disconnected from the source but can be connected by means of a normally open, momentarily actuable manual start switch 57 or a normally open switch 58 shunting the start switch 57 and actuated by the second or internal control cam 53. The arrangement is such that momentary actuation of the switch 57 will start the motor 50, rotating the internal control cam 53 until its raised surface portion 59, constituting most of its circumference, underlies a cam follower 60 forming part of the control switch 58. At this time, a circuit to the motor is completed through the switch 58, permitting the start switch 57 to be released. The motor 50 will remain energized until the control cam 53 has been rotated through a complete revolution (a total interval of one second), at which time the cam follower 60 will drop into a recessed cam surface portion 61 to open the switch 58.

During the one cycle rotation of the shaft 51, after closure of the start switch 57, a first raised surface portion 62 of the first or external control cam 52 moves under a cam follower 63 forming part of a double-throw switch, designated generally by the numeral 64. When this occurs, the center blade 65 of the switch 64 is raised, opening a set of normally closed contacts 66 and interrupting the power supply to all of a plurality of motors M, representing drive motors for all of the counter-indicator units of a given bank, The arc encompassed by the raised cam portion 62 is sufficient to provide an interval (e.g. ¼ of a second) during which any counter-indicator unit in the act of indexing at the time of opening of the contacts 66, can continue the indexing to completion and come to rest. With the novel instantaneous unrestricted transfer arrangement according to the invention, the required interval for completion of indexing may be extremely small, as will be understood.

After the indexing interval, represented by the cam surface 62, a second raised portion 67 of increased cam height is brought under the cam follower 63, deflecting the blade 65 further and causing a set of normally opened contacts 68 to be closed and complete a circuit to a unit, designated by the letter C, serving to actuate the photographic recording apparatus. The unit C may be a flash bulb, camera shutter, etc., as will be understood.

The contacts 68 need be closed only momentarily, and the external control cam 52 is so contoured as to then accommodate return of the deflected blade 65, opening the contacts 68 and reclosing the contacts 66 to restore power to the various counter motors. As will be understood, the cam 52 advantageously is so contoured that the total period of deactivation of the counter motors does not significantly exceed the time required to complete any indexing movements and to photographically record the condition of the counters.

Thus, the system illustrated in FIG. 5, used in conjunction with the system of FIG. 1, is operative automatically and in predetermined high speed sequence, to deactivate all counter-indicator units of a panel to be recorded, provide a brief indexing interval at the end of which it is assured that all units will be motionless and in definite index positions, actuate a camera or other recording device, and then reactivate the counter-indicator units. The entire interval, during which the counter units are deactivated, is a fraction of a second.

The system of the invention is made practical in part by the provision of a novel counter-indicator mechanism, in which the transfer movement of the counter elements is unrestricted and practically instantaneous. At the same time, all of the elements of a counter are maintained in coupled relation with a drive motor for the counter. The novel counter operation advantageously is realized by providing a cam-compensated counter transfer mechanism of the general type described and claimed in the A. W. Haydon U.S. Patent No. 3,069,083, in which the first operative member of the counter is a non-indicating element and in which lost motion drive means are employed to accommodate overcentering, free advance of the non-indicating element for substantially instantaneous indexing of the visible or indicating counter elements.

A significant practical aspect of the invention resides in the use of a low cost, high reliability, instant start-stop synchronous motor, for driving the counter mechanism intermittently, as required, in such a way as to avoid consequential error in either direction and particularly toward the "high" side. A particularly accurate and reliable motor for this purpose, available at a cost consistent with the contemplated end uses of the mechanism, is provided by the teachings of the before-mentioned Van Lieshout and Riggs patents, being described conveniently as a unidirectionally self-starting synchronous inductor motor with a non-salient ferrite rotor. Motors particularly suitable for the purpose intended herein are available commercially from the source previously identified.

Although the system of the invention is not necessarily thus limited, it is particularly adapted for use in a telephone monitoring system in which a large plurality (e.g., several hundred) of telephone circuits are monitored by separate counter mechanisms displayed in closely grouped relation on an exposed panel board. Using the novel synchronously driven counter-indicator mechanism of the invention, with its instantaneous and unrestricted transfer operation, it is possible and highly advantageous to utilize the control system of the invention, whereby an entire panel board of indicators is momentarily deactivated, permitted to come to rest in assured index positions, photographed, and restarted, all in an extremely short period of time, and easily within an interval of one second.

It should be understood, however, that the specific forms of the invention herein illustrated and described are intended to be representative only, as certain changes may be made therein without departing from the clear teachings of the invention. Accordingly, reference should be made to the following appended claims in determining the full scope of the invention.

I claim:

1. A system for monitoring and periodically recording the time usage of a plurality of telephone circuits or the like, which comprises (a) a transfer counter type indicator for each circuit or the like, (b) a substantially instant start-stop, controlled-speed motor for each indicator, for driving the indicator, (c) overcentering, lost motion drive means coupling each motor with its indicator, whereby each indicator has substantially instantaneous, unrestricted transfer motion, and (d) control means operable to deactivate the motors of a predetermined group, after a predetermined interval to effect a recordation of the condition of the individual counters of the group, and immediately thereafter to reactivate the motors of said group.

2. The system of claim 1, in which each of said counters comprises (a) a non-indicating counter element and at least one indicating counter element, (b) resiliently biased and cam-modified gear reduction means continuously connecting said non-indicating element to the lowest order indicating element, and (c) lost motion means continuously coupling the non-indicating counter element to the individual drive motor for the counter.

3. A system for monitoring and periodically recording the time usage of a plurality of telephone circuits or the like, which comprises (a) a transfer counter type indicator for each circuit or the like, (b) a substantially instant start-stop, controlled-speed motor for each indicator, for driving the indicator, (c) control means for temporarily deactivating said indicators to accommodate photographic recordation of the instantaneous condition thereof, and (d) means for effecting the continued advance, during a predetermined interval following deactivation of said indicators, of all indexing elements of the indicators to definite index positions,
(e) said control means including means for reactivating said indicators substantially immediately following said predetermined interval.

4. The system of claim 3, in which said means for effecting continued advance of said indicators comprises
(a) a lost motion drive connection connecting each indicator to its respective drive motor, and
(b) a spring-operated overcentering transfer connection between a first non-indicating element of the indicator and a second indicating element.

5. The system of claim 4, in which said control means comprises
(a) first switch means for deactivating for a predetermined interval all of the drive motors of a predetermined group of indicators,
(b) second switch means operative a predetermined time after activation of said first switch means to effect a recordation of the then instantaneous condition of the indicators of said group, and
(c) means for reactivating said motors substantially immediately after recordation of said indicators.

6. A system for periodically recording the time usage of a large plurality of telephone circuits or the like, which comprises
(a) a transfer counter-time indicator for each circuit,
(b) said counter-indicator including a low order element having an overcentering transfer action,
(c) motor drive means for said low order element, including an electric drive motor having substantially instantaneous start-stop characteristics,
(d) a lost motion drive connection accommodating unrestricted overcentering transfer movement of said low order element independently of said motor,
(e) means interconnecting respective telephone circuits or the like with respective drive motors for energizing said motors selectively for unidirectional rotation during periods when said telephone circuits are operative, and
(f) means mounting said large plurality of indicators in closely grouped, exposed position suitable for periodic photographic recordation.

7. The system of claim 6, which includes
(a) control means for simultaneously deactivating all of the drive motors of a predetermined group for a predetermined interval, and
(b) means for recording the then instantaneous condition of the indicators of said group at a predetermined time close to the end of said interval.

8. A system for periodically recording the time usage of a telephone circuit or the like, which comprises
(a) a transfer counter time indicator including a plurality of indicating drums,
(b) said counter indicator including a first counter element having an overcentering transfer action,
(c) motor drive means for said first counter element, including a synchronous electric motor having substantially instantaneous start-stop characteristics,
(d) a lost motion drive connection accommodating unrestricted overcentering transfer movement of said first counter element independently of said motor, and
(e) means interconnecting a telephone circuit or the like with said drive motor for energizing said motor for unidirectional synchronous rotation during periods when said telephone circuit is operative.

9. The system of claim 8, in which
(a) said lost motion drive connection includes a non-indicating counter element,
(b) said first counter element being connected to said non-indicating element by a spring-actuated, gear-connected overcentering transfer means.

10. The system of claim 9, in which said overcentering transfer means comprises
(a) a drive gear on said non-indicating element,
(b) a driven gear on said first counter element,
(c) a planetary differential transfer gear connecting said drive gear and said driven gear, and
(d) cam means driven by said non-indicating element and operative to retract said transfer gear in compensating relation to its tendency to advance said first counter element throughout a predetermined major portion of a revolution of said non-indicating element.

11. A mechanism for periodically recording the time usage of a telephone circuit or the like, which comprises
(a) a transfer counter time indicator,
(b) said counter-indicator including a first indicating counter element having an overcentering transfer action,
(c) motor drive means for said first counter element, including an electric drive motor, and
(d) a lost motion drive connection accommodating unrestricted overcentering transfer movement of said first counter element independently of said motor,
(e) said motor drive means including means for starting and stopping said indicator substantially instantly upon energization and deenergization of said electric drive motor.

12. The mechanism of claim 11, in which
(a) said lost motion drive connection includes a drive element and a driven element,
(b) said driven element being movable independently of said drive element, in the driven direction, for a distance sufficient to enable said first indicating counter element to advance unrestrictedly from one index position to another.

13. The mechanism of claim 11, in which said counter comprises
(a) a plurality of indicating counter elements and a non-indicating counter element,
(b) transfer means connecting the non-indicating element to the first or lowest order indicating element and connecting the lower order elements to higher order elements,
(c) at least the transfer means connecting the non-indicating element to the lowest order indicating element comprising an overcentering mechanism whereby said lowest order indicating element advances to successive index positions with a high speed, unrestricted snap action.

14. The mechanism of claim 13 in which the last-mentioned transfer means comprises
(a) transfer gear means connecting the non-indicating and lowest order indicating elements and tending to advance the indicating element at one-tenth the speed of the non-indicating element,
(b) compensating means operative throughout a major portion of each revolution of the non-indicating element to retract the transfer gear means an amount corresponding to the tendency to advance the lowest order indicating element, and to release the transfer gear means at a predetermined point in each rotation of the non-indicating element to effect indexing of the lowest order indicating element.

15. A system for periodically recording the time usage of a large plurality of telephone circuits or the like, which comprises
(a) a transfer counter time indicator for each circuit,
(b) motor drive means for said counter,
(c) means interconnecting respective telephone circuits or the like with respective motor drive means for energizing said drive means for unidirectional rotation during periods when said telephone circuits or the like are operative,
(d) means mounting said large plurality of indicators in closely grouped, exposed position suitable for periodic photographic recordation, and
(e) means for simultaneously deactivating all of the motor drive means of a predetermined group for a predetermined interval to accommodate photographic recordation.

16. The system of claim 15, in which (a) said motor drive means includes means automatically operative upon deactivation of the drive means to cause individual indicators to assume definite index positions during said predetermined interval and prior to said photographic recordation.

17. A mechanism for periodically recording the time usage of a telephone circuit or the like, which comprises (a) a transfer counter time indicator, (b) motor drive means for said counter, (c) means enabling the interconnection of a telephone circuit or the like with said motor drive means for energizing said drive means for unidirectional rotation during periods when said telephone circuit or the like is operative, (d) said mechanism including an overcentering, lost motion drive connection whereby said indicator has unrestricted, high speed indexing from one incremental indicating position to another.

References Cited by the Examiner

UNITED STATES PATENTS

| | | | |
|---|---|---|---|
| 2,392,890 | 1/1946 | Vincent et al. | 179—7.1 |
| 3,119,558 | 1/1964 | Kinross | 235—132 |

KATHLEEN H. CLAFFY, *Primary Examiner.*

H. ZELLER, *Assistant Examiner.*